United States Patent [19]

Garcia

[11] Patent Number: 5,137,595
[45] Date of Patent: Aug. 11, 1992

[54] PAINT ROLLER MANUFACTURING APPARATUS

[75] Inventor: Jaime A. Garcia, Barcelona, Spain

[73] Assignee: Newell Co., Freeport, Ill.

[21] Appl. No.: 656,104

[22] Filed: Feb. 11, 1991

Related U.S. Application Data

[60] Continuation of Ser. No. 325,102, Mar. 13, 1989, abandoned, which is a continuation of Ser. No. 65,381, Jul. 28, 1987, abandoned, which is a division of Ser. No. 807,818, Dec. 11, 1985, Pat. No. 4,692,975.

[30] Foreign Application Priority Data

Jan. 11, 1985 [ES]  Spain .................................... 283921

[51] Int. Cl.$^5$ ............................................. B32B 31/00
[52] U.S. Cl. .................................... 156/425; 156/187; 156/195; 156/429; 156/430; 156/431; 156/446; 156/499
[58] Field of Search ................ 156/184, 185, 187, 188, 156/190–192, 195, 425, 428–431, 446

[56] References Cited

U.S. PATENT DOCUMENTS

| | | | |
|---|---|---|---|
| 2,700,631 | 1/1955 | Ferguson | 156/187 X |
| 2,810,424 | 10/1957 | Swartswelter | 156/187 X |
| 3,232,545 | 2/1966 | Ross et al. | 156/446 |
| 3,401,073 | 9/1968 | Wood | 156/195 X |
| 3,616,070 | 10/1971 | Lemelson | 156/446 |
| 4,078,957 | 3/1978 | Bradt | 242/7.22 X |
| 4,191,792 | 3/1980 | Janssen | 427/260 X |

FOREIGN PATENT DOCUMENTS

| | | |
|---|---|---|
| 0069335 | 1/1983 | European Pat. Off. . |
| 2303230 | 7/1974 | Fed. Rep. of Germany . |
| 2093060 | 1/1972 | France ................................. 156/195 |

*Primary Examiner*—David A. Simmons
*Assistant Examiner*—James J. Engel, Jr.
*Attorney, Agent, or Firm*—Baker & McKenzie

[57] ABSTRACT

A paint roller is comprised of a thermoplastic tubular core and a cover fabric heat-fused thereto without an intermediate adhesive. The fabric is wound around the core in a helical path, and the core is heat-softened in the zone of winding to fuse the fabric to the core as it is wound thereon.

1 Claim, 3 Drawing Sheets

PAINT ROLLER MANUFACTURING APPARATUS

This application is a continuation of application Ser. No. 325,102 filed Mar. 13, 1989 now abandoned which is a continuation of 07/065,381 filed Jul. 28, 1987 now abandoned, which is a division of 06/807,818 filed Dec. 11, 1988 now U.S. Pat. No. 4,692,975.

BACKGROUND OF THE INVENTION

1. Field of the Invention

The present invention relates to a novel construction, and a method and apparatus for the manufacture thereof, for a paint roller comprised of a tubular thermoplastic core and a fabric cover. In accordance with the invention, the fabric cover is wound helically (in spiral form) over the plastic core and the fabric cover and the plastic core are forged together, to form an integral body, by applying heat to the core.

2. Background of the Invention

In the manufacture of paint rollers as presently practiced, a tubular plastic or cardboard core is inserted lengthwise over a rotating cylinder or spindle. The fabric cover, in the form of a tape or strip, is wound over the tubular core in a helical manner. This is done by feeding the fabric strip over the core from a guide oriented obliquely to the axis of the core and moving the guide lengthwise of the core in timed relation to the speed of rotation of the spindle. An adhesive is used to adhere the fabric strip to the core, and this type of device therefore requires both a supply of adhesive and apparatus for applying the adhesive material in the proper amounts to the fabric and/or the core.

The bonding of the fabric to the tubular core by use of an adhesive presents several manufacturing problems resulting from the difficulty of consistently applying the adhesive in proper doses. Also, a special adhesive must be used to produce the desired bond between the core and the fabric. These disadvantages considerably increase the cost and complexity of manufacture of the paint rollers.

SUMMARY OF THE INVENTION

It is an object of the present invention, therefore, to provide a novel paint roller construction, and a method and apparatus for the manufacture thereof, that permits bonding of the fabric strip to the tubular core without the use of adhesives and the components required for the supply and measuring thereof.

A further object of the invention is to provide a novel paint roller construction in which the fabric cover is heat bonded to a tubular thermoplastic core without requiring a separate adhesive material.

Still a further object of the invention is to provide a novel paint roller construction, and a method and apparatus for the manufacture thereof, in which the fabric cover is integrally bonded to a tubular plastic core by heat-softening the core to fuse the cover thereto, to form a single unitary body.

These and other objects of the invention are attained by winding the fabric cover strip over a tubular thermoplastic core and by fusing the fabric directly to the core, without the use of an adhesive, by applying heat to the core in the zone where the fabric is wound thereon. Preferably, the heat source is located parallel to the plastic core in the region immediately forward of the point where the fabric is fed over the core. The fabric is supplied to the core along a guide oriented obliquely to the core axis to wind the fabric over the axis in a helical path.

BRIEF DESCRIPTION OF THE DRAWINGS

For a better understanding of the invention, reference may be made to the following description of illustrative embodiments thereof and to the accompanying drawings, in which.

DETAILED DESCRIPTION OF THE INVENTION

Figure 1:
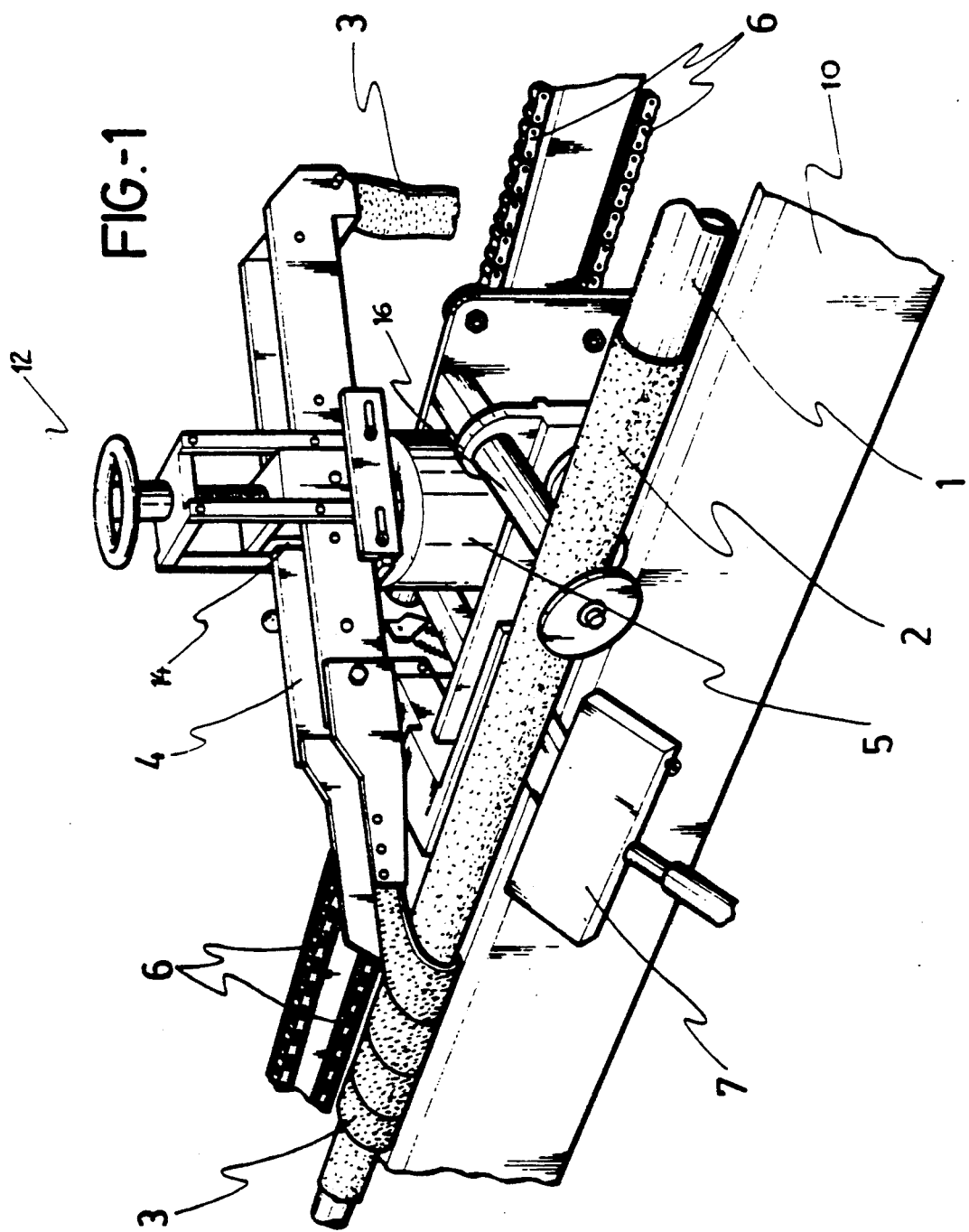
FIG. 1 is a perspective view of one embodiment of an apparatus for manufacture of the novel paint roller of the present invention.
Figure 2:
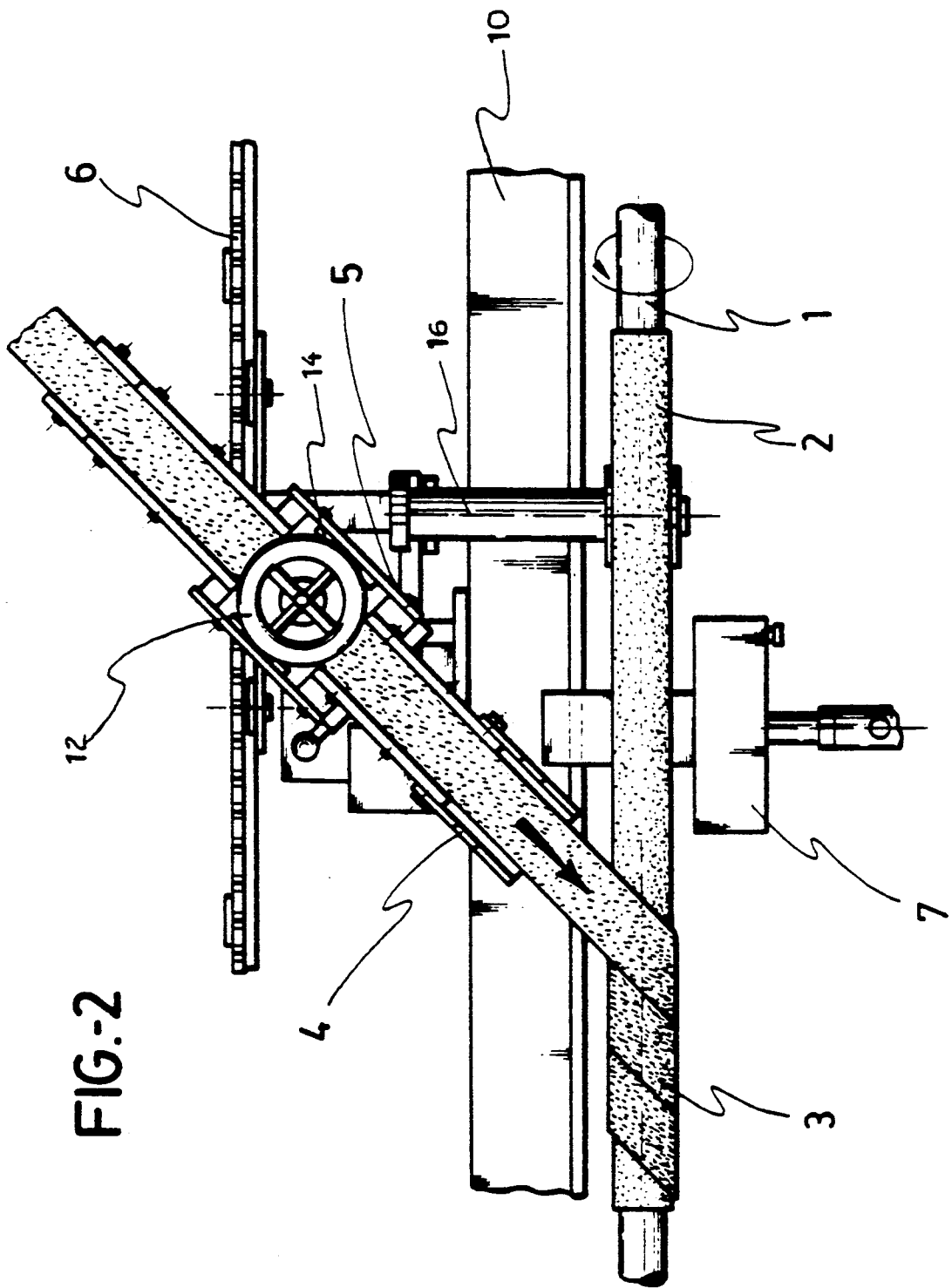
FIG. 2 is a plan view of the apparatus of FIG. 1.
Figure 3:
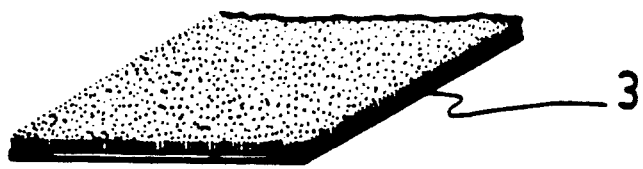
FIG. 3 is a perspective view of a section of the fabric strip used in fabricating the paint roller of the invention.
Figure 4:
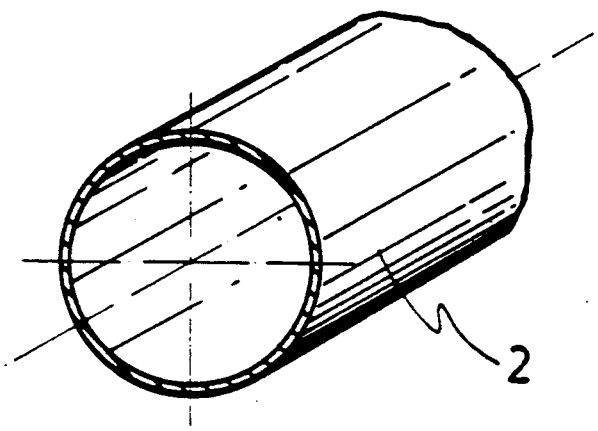
FIG. 4 is a perspective view of a section of a plastic tubular core used in fabricating the paint roller of the invention.

In the embodiment of the apparatus illustrated in FIGS. 1 and 2, a length of plastic tubular core stock 2 is inserted lengthwise over a spindle or cylinder 1. The plastic stock preferably comprises polypropylene, but may be made of any suitable thermoplastic material having the desired heat-bonding characteristics. As indicated in FIG. 2, the cylinder 1 is rotated (by a conventional means not shown) in the counterclockwise direction so as to wind around the core 2 a fabric strip 3. The fabric material is shown in more detail in FIG. 3, and is in fact a conventional cover material for a paint roller.

The fabric strip 3 is fed to the core 2 by a guide 4 that is adjustably mounted on a carriage 5 so as to be oriented at an angle to the axis of the cylinder 1. The carriage 5 is moved parallel to the cylinder 1 along a frame 10, on which it is movably supported in a conventional manner. The movement of the carriage 5 is controlled by a chain drive 6. The speed of movement of the carriage 5 is timed relative to the speed of rotation of the cylinder 1 so that the fabric strip 3 is wound on the plastic core 2 in a tight helix.

The fabric strip 3 is fed to the guide from a supply (not shown) and preferably is of a standard width and thickness, as is known in the art. If desired, the walls of the guide 4 may be made adjustable to accommodate strips of different widths. A hand wheel 12 is connected via a threaded shaft to a pressure pad 14 to apply a desired amount of pressure to the strip 3. This pressure serves to maintain the strip 3 under tension (in the direction of the arrow in FIG. 1), so that the strip will be wound tightly on the core 2. The carriage also includes a roller guide 16 which maintains the cylinder 1 and core 2 in the proper positional relationship to the guide 4.

As a feature of the invention, no adhesive is used to bond the fabric strip 3 to the core 2 which, as will readily be apparent to those skilled in the art, has been preformed and prehardened. Instead, a heat source 7 is positioned to soften the surface of the core 2 just in advance of the zone of winding of the strip on the core. The heat source 7 is preferably somewhat elongated in the direction of the axis of the core 2, and suitably comprises a manifold-like structure for directing a series of flame jets against the surface of the core. Any suitable fuel may be used, such as, for example, natural gas. Alternatively, the heat source 7 may comprise an electrical, optical, or other type energy source. The heat source 7 is mounted on the carriage 5 for movement therewith along the length of the core 2. In this way, the surface of the core 2 in the zone of winding is heat-softened from ambient temperature to the point that the fabric strip 3 is fused thereto upon being wound over the core 2. The resulting structure 8, illustrated in FIG. 5, is a paint roller in which the fabric strip and the plastic core have in effect been fused into an integral unitary body.

Figure 5:
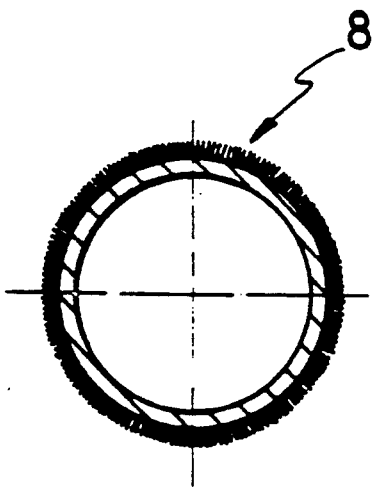
FIG. 5 is a transverse sectional view of the paint roller of the invention, showing the integral forging of the fabric cover to the plastic core to form a unitary paint roller structure.

The paint roller 8 of FIG. 5 may be used as a replacement element or it may be provided with end pieces and a handle to form a complete roller assembly.

The present invention thus affords a simple low cost method and apparatus of manufacture that obviates the aforementioned problems of the prior art adhesive technique. The method and apparatus may therefore be readily set up and practiced with only a comparatively small investment in facilities and in personnel training. Also, the paint roller of the invention is a lightweight, strong and very clean end product that is free of the adhesive-related defects found in prior art paint rollers.

Although the invention has been described and illustrated herein by reference to specific embodiments thereof, it will be understood that such embodiments are susceptible of modification and variation without departing from the inventive concepts disclosed. All such modifications and variations, therefore, are intended to be included within the spirit and scope of the appended claims.

I claim:

1. Apparatus for manufacturing paint rollers of a desired length from pre-hardened, pre-formed tubular core stock having a fixed length which is a multiple of the length of the finished paint roller, said apparatus including, in combination, means for inserting a piece of pre-hardened, pre-formed plastic tubular bar stock of a fixed length which is a multiple of the final paint roller cover a stock support which rotates about a fixed axis whereby the pre-hardened, pre-formed fixed length tubular bar stock is rotated about its own axis, a pile fabric feeder which feeds unheated pile fabric in strip form to the fixed length, rotating tubular bar stock, a source of heat located radially outside of and spaced from the outer surface of the fixed length, rotating piece of tubular bar stock, said heat source being located between the cold end of the fixed length, rotating piece of tubular bar stock and the junction of the bar stock and the intersection of the unheated pile fabric strip, said heat source being further located near said intersection but upstream toward the cold end of the fixed length bar stock a distance sufficient to enable the outer surface portion of the bar stock to be heated to a degree which will enable the unheated pile fabric to bond to the fixed length tubular bar stock after contact is made therebetween, means for timing rotational movement of the fixed length, initially pre-hardened, pre-formed tubular bar stock and the feed rate of the pile fabric to cause the adjacent edges of the pile fabric to butt tightly against one another without overlap upon cooling of the outer surface portion of the said initially cold, and then heated, outer surface portion of the fixed length tubular bar stock, said stock support being axially stationary whereby translational movement of the stock support along its axis does not occur, said pile fabric feeder including means for moving it in a direction parallel to the axis of the stock support as the unheated pile fabric is fed to the rotating tubular bar stock, and said heat source being connected to and movable with the pile fabric feeder whereby said heat source is moved together with the pile fabric feeder in a direction parallel to the axis of the stock support as the unheated pile fabric is fed to the rotating tubular bar stock.

* * * * *